(12) United States Patent
Guyatt et al.

(10) Patent No.: US 11,812,896 B2
(45) Date of Patent: Nov. 14, 2023

(54) FOODSTUFF PROCESSING SYSTEM

(71) Applicant: Sunbeam Corporation Pty Ltd, Botany (AU)

(72) Inventors: Maxim K. Guyatt, Botany (AU); Timothy Edward Gulliver, Botany (AU); Mark James Whitcombe, Botany (AU)

( * ) Notice: Subject to any disclaimer, the term of this patent is extended or adjusted under 35 U.S.C. 154(b) by 403 days.

(21) Appl. No.: 17/258,364

(22) PCT Filed: Jul. 8, 2019

(86) PCT No.: PCT/AU2019/050714
§ 371 (c)(1),
(2) Date: Jan. 6, 2021

(87) PCT Pub. No.: WO2020/006610
PCT Pub. Date: Jan. 9, 2020

(65) Prior Publication Data
US 2021/0267415 A1    Sep. 2, 2021

(30) Foreign Application Priority Data

Jul. 6, 2018   (AU) ............................. 2018902472

(51) Int. Cl.
| | |
|---|---|
| *A47J 42/50* | (2006.01) |
| *A47J 42/08* | (2006.01) |
| *A47J 31/42* | (2006.01) |
| *A47J 42/18* | (2006.01) |
| *A47J 43/046* | (2006.01) |

(52) U.S. Cl.
CPC ............... *A47J 42/50* (2013.01); *A47J 42/08* (2013.01); *A47J 31/42* (2013.01)

(58) Field of Classification Search
CPC .. A47J 42/50; A47J 42/08; A47J 42/18; A47J 43/046; A47J 31/42
See application file for complete search history.

(56) References Cited

U.S. PATENT DOCUMENTS

2004/0173101 A1* 9/2004 Steckhan ................ A47J 42/50
                                                        99/275
2007/0063079 A1  3/2007 Ford
(Continued)

FOREIGN PATENT DOCUMENTS

| AU | 2009202486 A1 | 1/2010 | |
| AU | 2009202515 A1 * | 1/2010 | ............. A47J 42/50 |

(Continued)

*Primary Examiner* — Matthew Katcoff
*Assistant Examiner* — Mohammed S. Alawadi
(74) *Attorney, Agent, or Firm* — Husch Blackwell LLP

(57) ABSTRACT

A foodstuff dispensing system is provided in which a foodstuff dispensing hopper comprises a gate rotatably mounted adjacent a bottom opening for selectively opening and closing the bottom opening. The hopper further comprises coupling means for detachably and rotationally coupling the hopper to the apparatus, and an interlock mechanism for interoperating with the gate to enable rotation of the bottom opening relative to the gate into an open position when the coupling means is being rotationally coupled to the apparatus and to enable rotation of the bottom opening relative to the gate into a closed position when the coupling means is being counter-rotationally decoupled from the apparatus.

21 Claims, 14 Drawing Sheets

(56) References Cited

U.S. PATENT DOCUMENTS

2007/0290003 A1  12/2007 Morin et al.
2012/0024160 A1   2/2012 Van Os
2020/0315401 A1* 10/2020 Deuber ................... A47J 42/46

FOREIGN PATENT DOCUMENTS

AU    2009202515 A1  1/2010
AU    2009240812 A1  6/2010
EP       2364624 A2  9/2011
EP       3135161 A1  1/2017

* cited by examiner

FOODSTUFF PROCESSING SYSTEM

FIELD OF THE INVENTION

The invention relates to foodstuff processing systems, and in particular to foodstuff dispensing hopper assemblies for use in such systems.

BACKGROUND OF THE INVENTION

Foodstuff processing systems often have a hopper or hopper assembly attached to a food processing apparatus for storing and dispensing the foodstuff to the apparatus. For example, coffee grinders and coffee machines with in-built grinders often use such a detachable hopper to store and dispense coffee beans to the grinder. As the hopper or hopper assembly is detachable, it can be removed for cleaning, service and maintenance of the processing mechanism within the processing apparatus, e.g. cleaning or maintaining the grinding burrs of a coffee grinder.

Hoppers need to be closed before they can be detached from their respective apparatus, to prevent the foodstuff from leaking out during and after the detachment process. Some hoppers include sprung trap doors that are biased closed and are mechanically held open when inserted into their respective apparatus. Other hoppers include a manually operated gate to close dispensing opening of the hopper. There are a number of limitations and trade-offs involved with these hoppers. For example, a drawback of the sprung trap door design is that any foodstuff caught in the door operating area can prevent the door from closing, thus allowing foodstuff to escape and spill. With the manual gate, the burden is on the user to remember to close the gate fully before removing the hopper.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In one aspect of the present invention, there is provided a foodstuff dispensing hopper comprising: a sidewall; a bottom opening; a gate rotatably mounted adjacent the bottom opening for selectively opening and closing the bottom opening; coupling means for detachably and rotationally coupling the hopper to a foodstuff processing apparatus, with the bottom opening in communication with a foodstuff receiving opening of the foodstuff processing apparatus; and an interlock mechanism for interoperating with the gate to enable rotation of the bottom opening relative to the gate into an open position when the coupling means is being rotationally coupled to the foodstuff processing apparatus and to enable rotation of the bottom opening relative to the gate into a closed position when the coupling means is being counter-rotationally decoupled from the food processing apparatus.

In another aspect of the present invention, there is provided a foodstuff processing system comprising: a foodstuff processing apparatus for processing foodstuff; and a foodstuff dispensing hopper for storing and dispensing the foodstuff to be processed, wherein the hopper comprises a side wall, a bottom opening, a gate rotatably mounted adjacent the bottom opening for selectively opening and closing the bottom opening, and coupling means for detachably and rotationally coupling the hopper to the processing apparatus, wherein the processing apparatus comprises a foodstuff receiving opening, complemental coupling means for receiving the coupling means of the hopper such that the bottom opening of the hopper is in communication with the foodstuff receiving opening, and a food processing mechanism for processing the foodstuff dispensed from the hopper through the foodstuff receiving opening, and wherein the processing system further comprises an interlock mechanism adapted to lock the gate of the hopper with the processing apparatus as the hopper is rotated between an inserted position and a coupled position such that the gate is fixed relative to the processing apparatus and the hopper rotates relative to the gate, wherein the bottom opening is closed by the gate in the inserted positon and rotation of the hopper to the coupled position thereby selectively opens the bottom opening.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
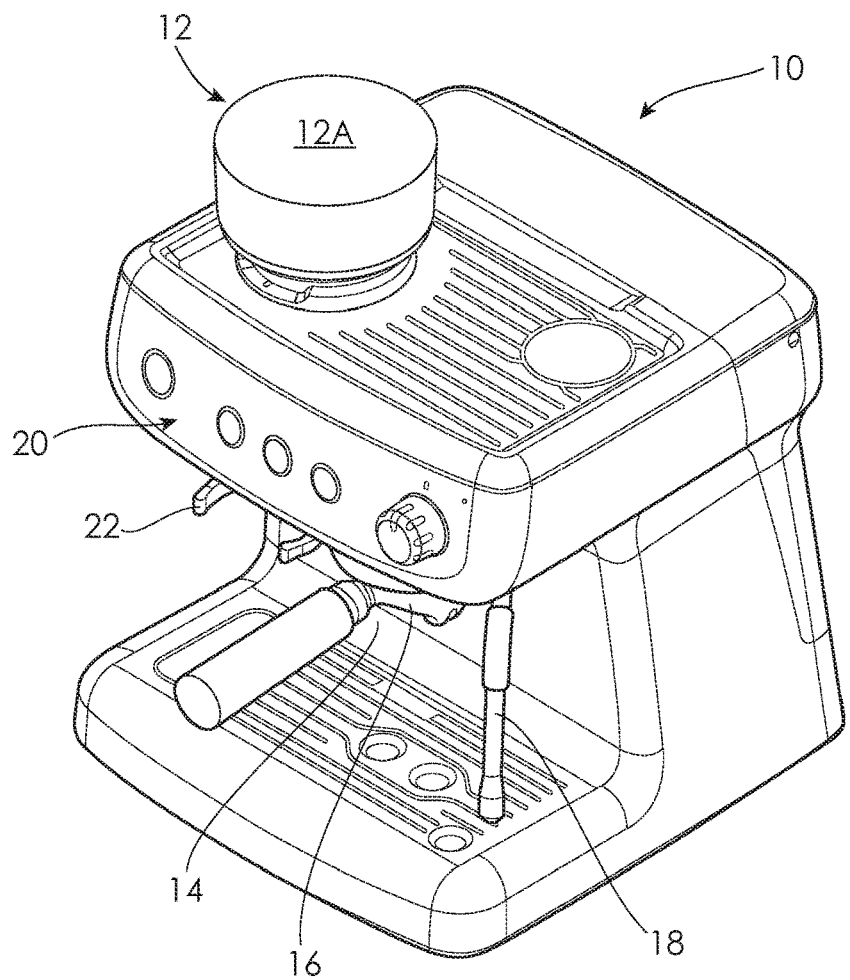
FIG. 1 is a top front right perspective view of an espresso machine with a coffee bean hopper in accordance with one aspect of the present disclosure.

Referring first to FIG. 1, an espresso machine 10 includes an inbuilt grinder (not shown) having a detachable hopper assembly 12. The espresso machine 10 includes a group head 14 for receiving a filter basket 16, a steam wand 18, control panel 20 and a grinder cradle 22. The grinder cradle is configured to activate a micro switch which turns on the grinder when the filter basket 16 is in position. It will be appreciated that where not described in detail, the various additional components making up the espresso machine will be familiar to a skilled reader.

Figure 2A:
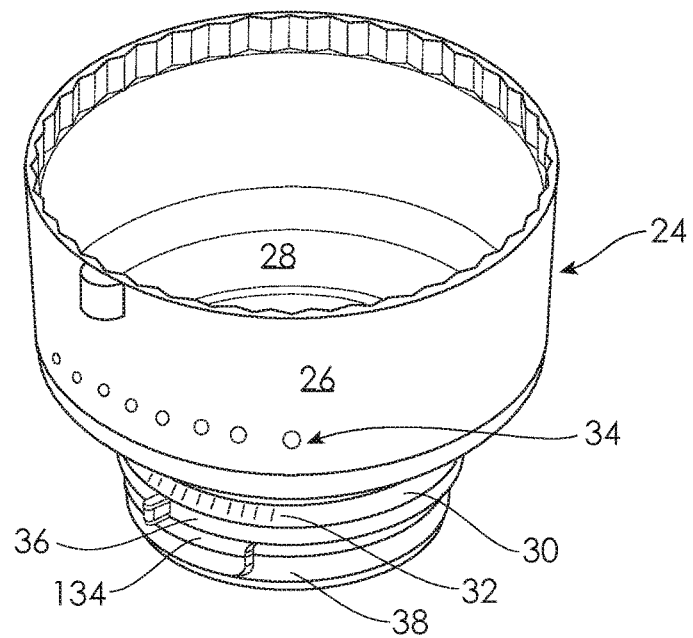
FIG. 2A is a top perspective view of a coffee bean hopper in accordance with another aspect of the present disclosure.
Figure 2B:
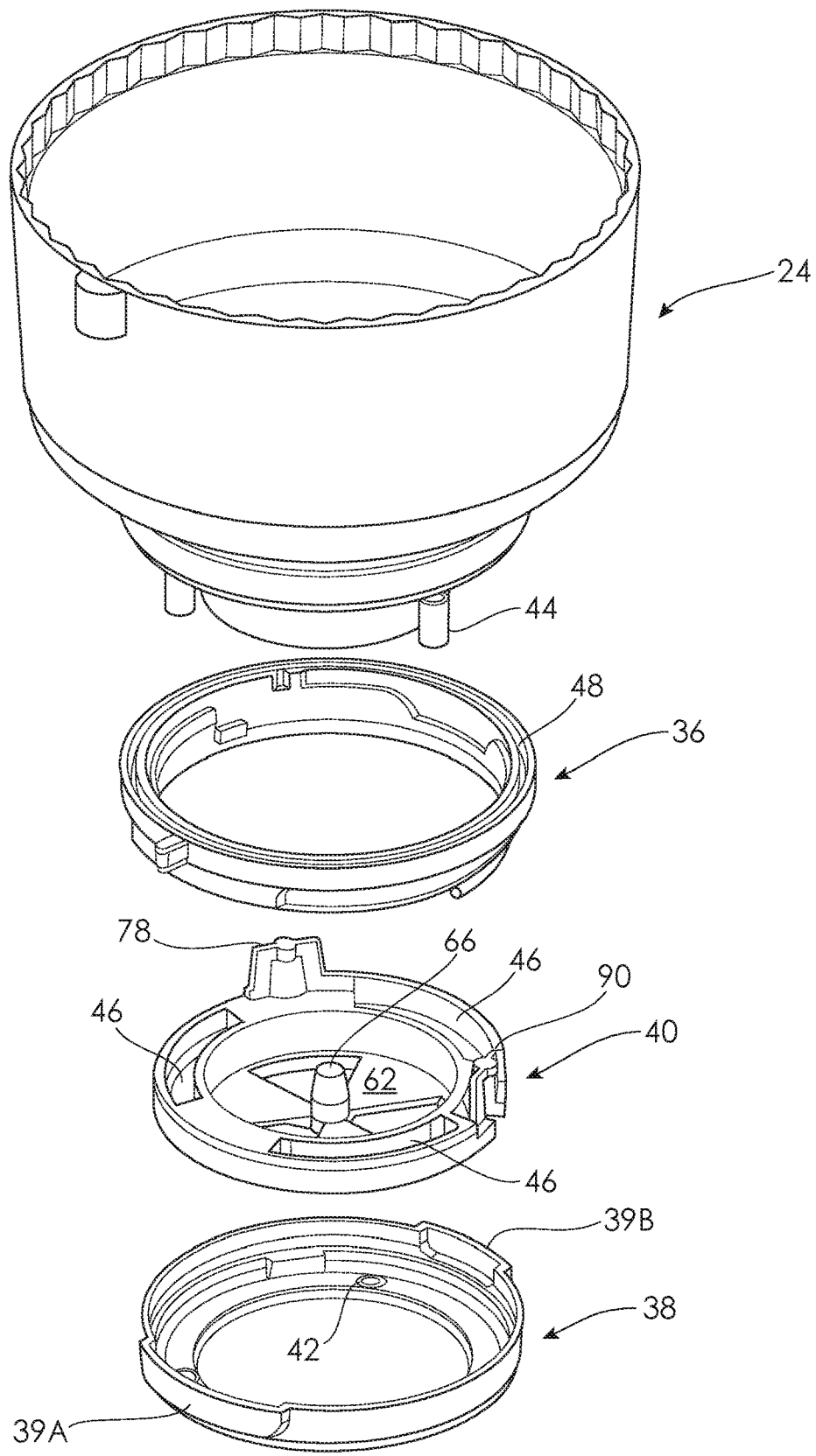
FIGS. 2B and 2C are exploded top and bottom perspective views, respectively, of the hopper.
Figure 2C:
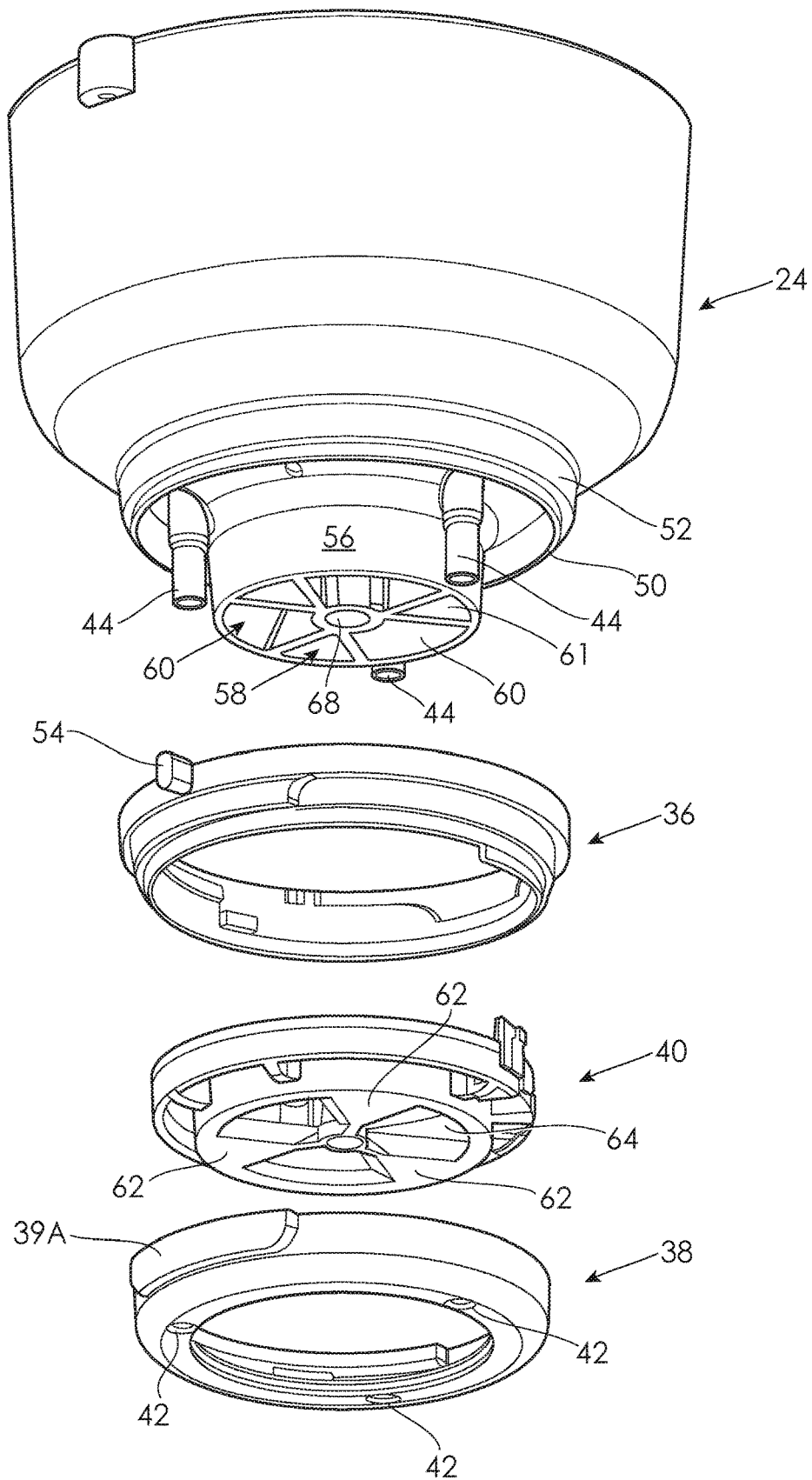

The hopper assembly 12 is shown in more detail in FIG. 2A with the lid 12A removed, and includes a hopper 24 formed from a hard transparent plastics material, such as styrene-acrylonitrile (SAN) or polycarbonate (PC), with a round cylindrical sidewall 26 and a lower frusto-conical portion 28 which terminates in a reduced diameter portion 30. A series of marked graduations 32 and 34 are formed in the respective reduced diameter portion 30 and sidewall 26 and indicate the fineness of the grind from coarse to medium to fine to allow for the grinder to be adjusted by rotation of the hopper as will be described further on in the specification. These marked graduations 32 and 34 are illustrated in greater detail in FIG. 12, The hopper assembly 12 also includes a locking ring 36 and a coupling ring 38. The various components of the hopper assembly can clearly be seen in the exploded views of FIGS. 2B and 2C, which include the hopper 24, the locking ring 36, the coupling ring 38 and a gate 40 sandwiched between the coupling ring 38 and the locking ring 36. The coupling ring 38 is connected to the hopper 12 by means of three screws (not shown) which pass through screw holes 42 in the coupling ring to internally threaded bosses 44 extending downwardly from the base of the hopper. The coupling ring 38 is formed with a circumferentialily long bayonet tab 39A and an opposed circumferentially short bayonet tab 39B which, although shorter in a circumferential direction projects further outwards in a radial direction.

The bosses 44 pass through arcuate guide slots 46 in the gate 40 which enable rotation of the gate relative to the hopper. The locking ring 36 is mounted rotatably between the hopper and the coupling ring, and includes an upper recess 48 which locates with a rim 50 of a skirt 52 extending from the hopper. The locking ring is formed with a locking lug 54 which prevents rotation of the ring relative to the espresso machine.

The hopper 24 is formed with a lowermost cylindrical wall 56 defining a bottom opening 58. The bottom opening is divided into three sectored window portions 60 alternating with three closed portions 61 at 60 degree intervals. The gate 40 is similarly formed with corresponding shutter and window portions 62 and 64. It will be understood that the number of window and closed portions, and corresponding shutter and window portions, is not limited to three, and that other embodiments may utilise one, two, four or more window and closed portions, corresponding shutter and window portions, which may also vary in shape.

A central stub axle 66 extends upwardly from the gate and locates with a corresponding aperture 68 formed in the centre of the opening 58 so that the gate 40 is able to rotate relative to the opening 58 of the hopper about a central axis with relative movement of 60 degrees between an open position in which the respective windows 64 and 60 are aligned to allow for the passage of coffee beans and a closed position in which the windows 60 are obturated by the shutters 62.

Figure 3A:
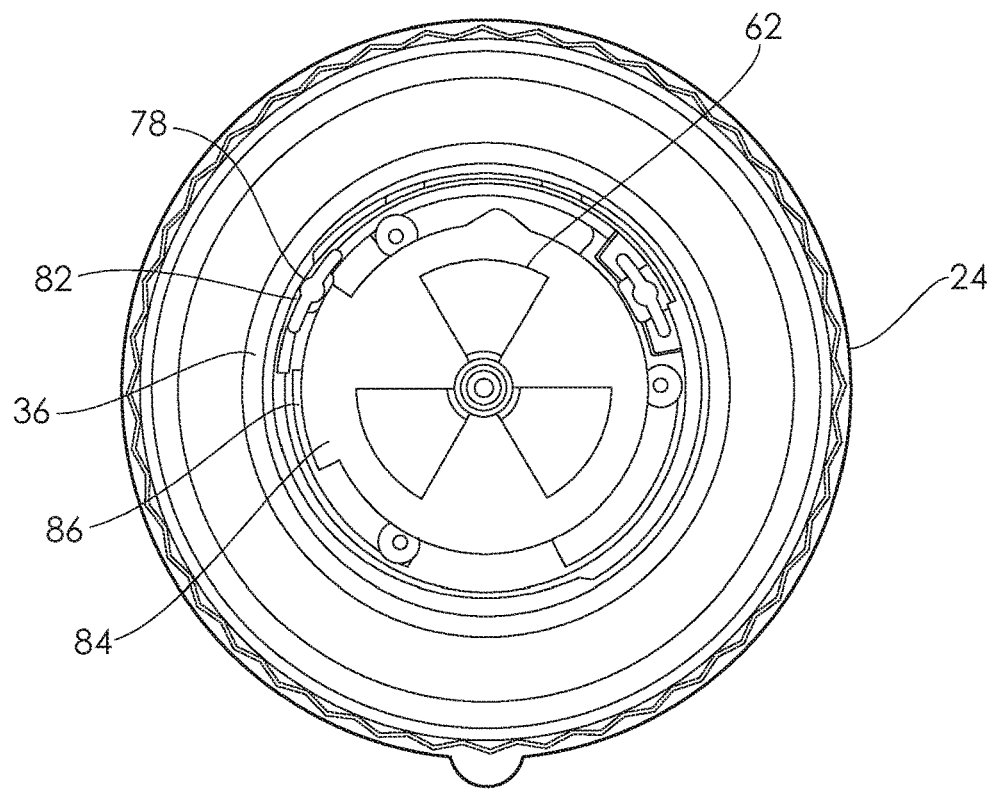
FIG. 3A is a top view of the coffee bean hopper in the closed position, with portions of the hopper removed to provide an unobstructed view of the interlock mechanism.
Figure 3B:
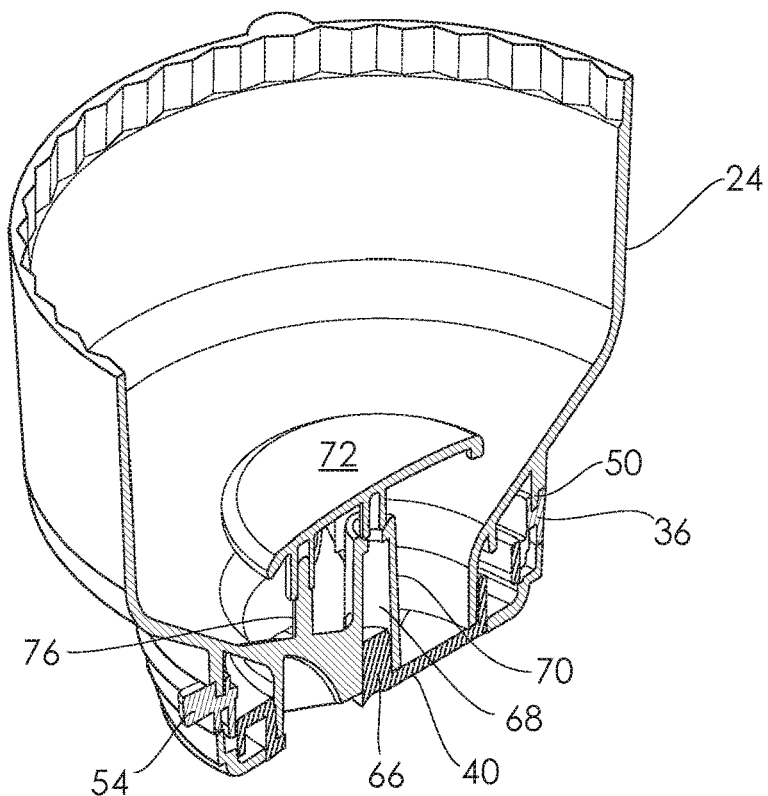
FIG. 3B is a perspective cross-sectional view of the hopper in the closed position as depicted in FIG. 3A, with the removed portions reinstated.

As is clear from FIG. 3B, the central aperture 68 is formed at the base of a hollow turret 70 to which a dome 72 is fitted. The dome is anchored on three side posts 76 and is configured to control the flow of coffee beans from the hopper 24 and prevent direct access to the grinding burr by the user. FIG. 3B also illustrates how the gate 40 is rotatably mounted within the base of the hopper. The gate 40 is also formed with first and second axially projecting resilient detent formations 78 and 90 which co-operate with the locking ring 38 and hopper 24 to form an interlock mechanism, the operation of which will now be described.

Referring first to FIG. 3A, the hopper 24 is shown in the closed position in which the shutters 62 of the gate 40 are in registry with the corresponding windows 60 of the hopper. In this position, it can clearly be seen how the first resilient detent formation 78 locates within a corresponding recess 82 formed on an inner face of the locking ring 36. The first resilient detent formation 78 is retained in the locked position by means of a retaining formation or projection 84 extending from hopper and having a arcuate profile 86 which abuts against the inner portion of the first resilient detent formation 78. The gate 40 and retaining ring 36 are accordingly locked together. The locking lug 54 holds the locking ring 36 and thus the gate 40 in a stationary position relative to the espresso machine while the hopper and coupling ring are able to rotate in the manner illustrated in FIGS. 4A and 4B.

Figure 4A:
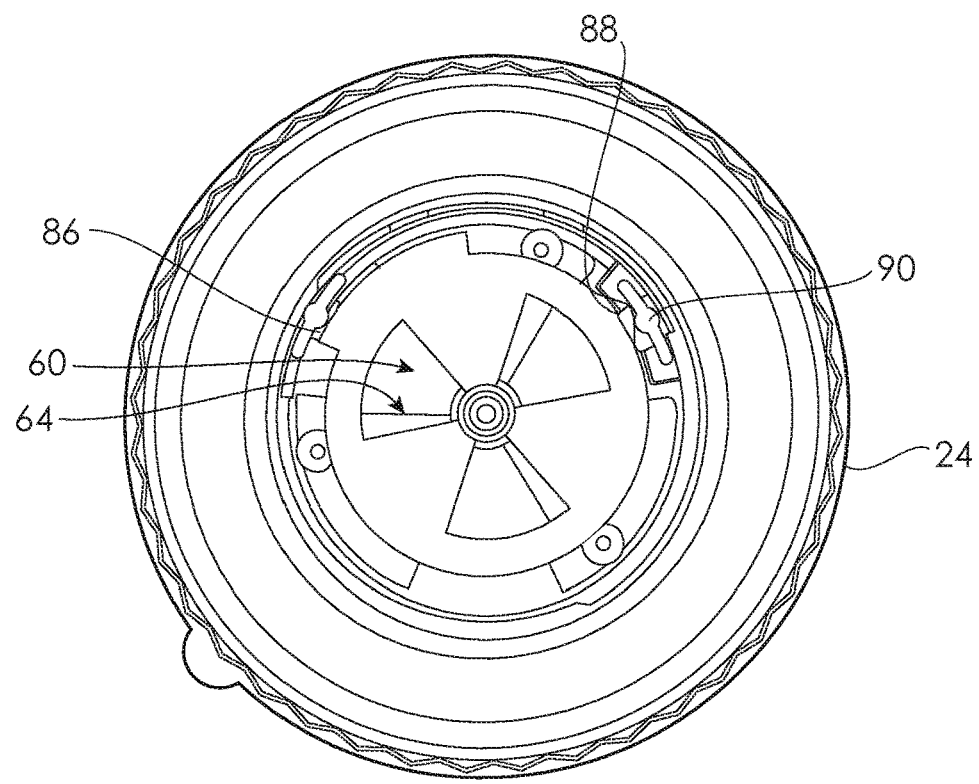
FIG. 4A is a top view of the coffee bean hopper in a partially open position, with portions of the hopper removed to provide an unobstructed view of the interlock mechanism.
Figure 4B:
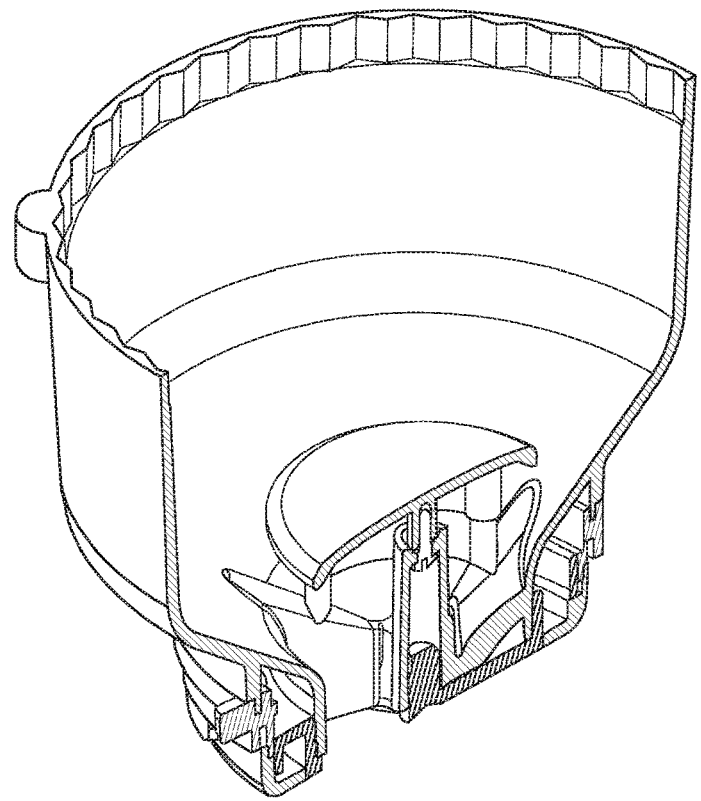
FIG. 4B is a perspective cross-sectional view of the hopper in the partially open position as depicted in FIG. 4A, with the removed portions reinstated.

In FIGS. 4A and 4B the hopper 24 and the coupling ring 38 are shown having rotated through an arc of close to 60 degrees, with the locking ring 36 and the gate 40 being held in the stationary position. As a result the respective windows 60 and 64 of the bottom opening 58 and gate 40 are rotated into registry with one another towards a fully opened position. In this position, a trailing edge of the arcuate profile 86 of the retaining projection 84 is still locking the first resilient detent formation 78 in position and a moving projection 88 on the hopper abuts the second resilient detent formation or moveable detent 90 extending from the gate 40.

Figure 5A:
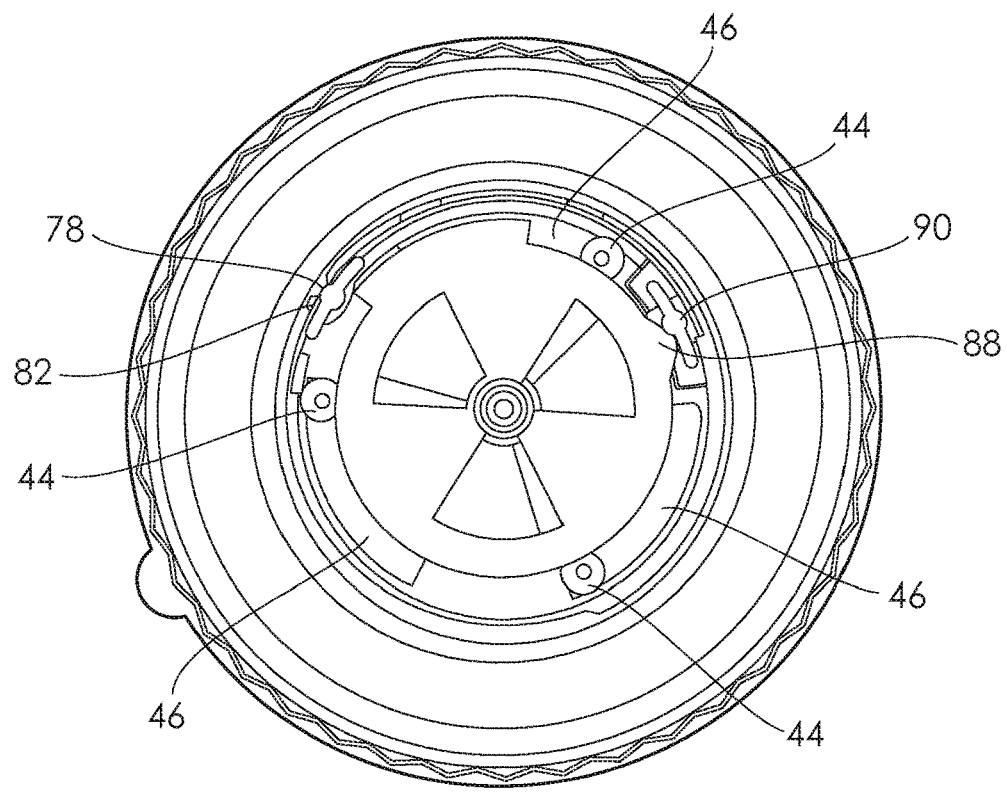
FIG. 5A is a top view of the coffee bean hopper in the fully open position, with portions of the hopper removed to provide an unobstructed view of the interlock mechanism.
Figure 5B:
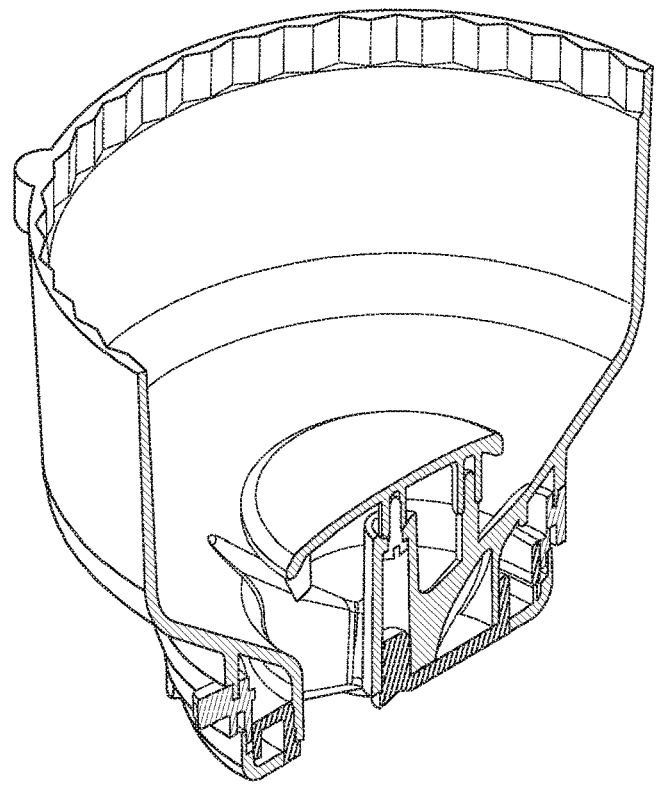
FIG. 5B is a perspective cross-sectional view of the hopper in the fully open position as depicted in FIG. 5A, with the removed portions reinstated.

In the 60 degree position illustrated in FIGS. 5A and 5B, the first resilient detent formation 78 is no longer locked in position by means of the arcuate profile of the projection 84, and is able to move out of the recess 82. At the same time, the moving projection 88 clicks over the moveable detent 90. Simultaneously, the bosses 44 abut the ends of the guide slots 46 in the gate 40, causing rotation of the gate 40, which is now disengaged from the locking ring 36, and moves in concert with the hopper 24 in the clockwise direction. Because the gate and the hopper are now rotating together, they remain in the fully opened position.

Figure 6A:
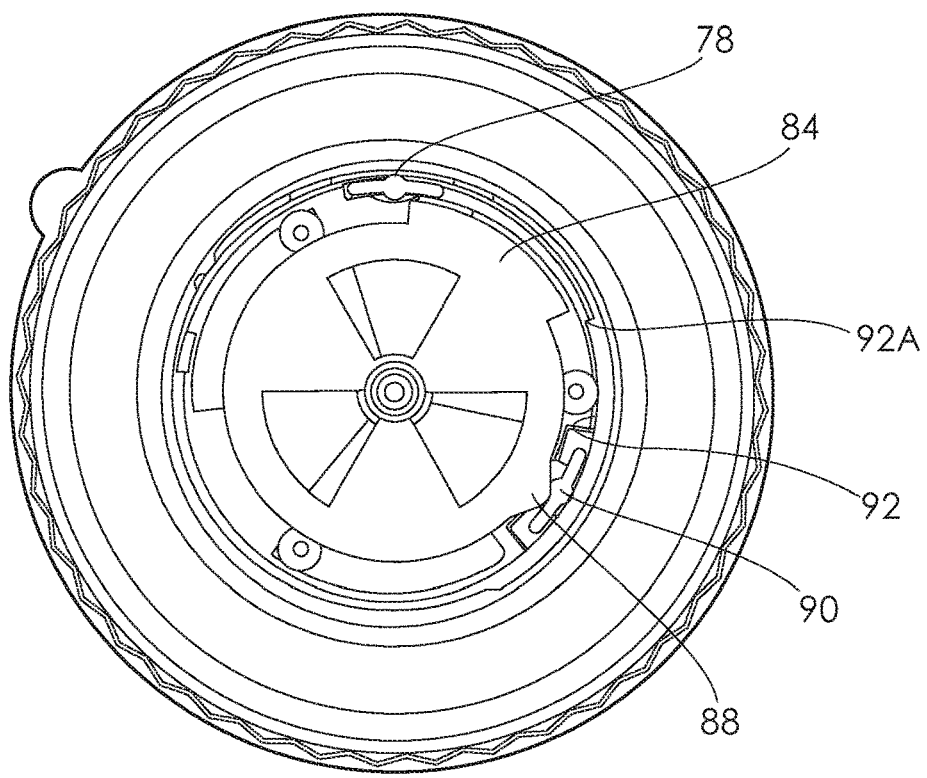
FIG. 6A is a top view of the coffee bean hopper in the fully open and over-rotated position, with portions of the hopper removed to provide an unobstructed view of the interlock mechanism.
Figure 6B:
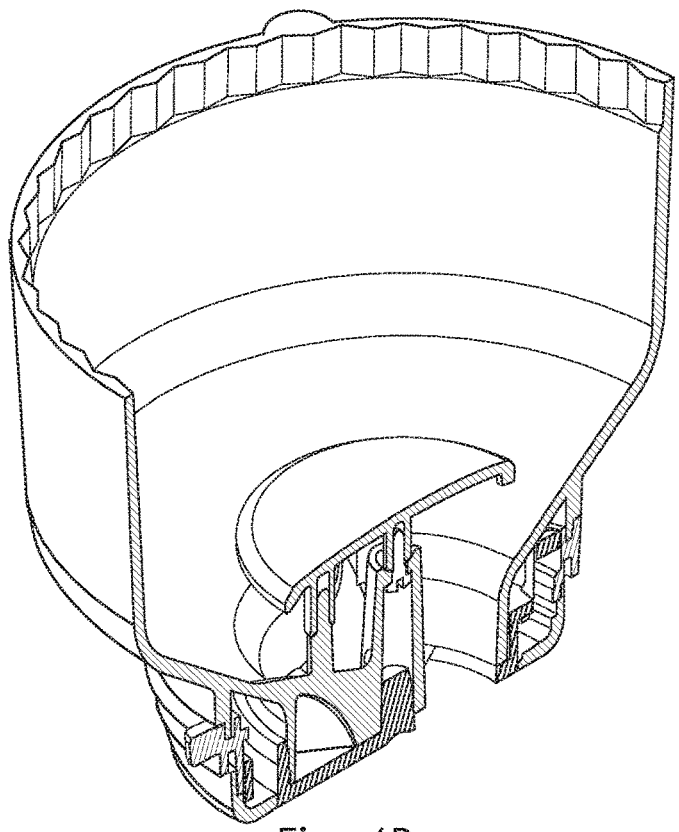
FIG. 6B is a perspective cross-sectional view of the hopper in the fully open and over-rotated position as depicted in FIG. 6A, with the removed portions reinstated.

Referring now to FIGS. 6A and 6B, the hopper is shown over-rotating clockwise beyond 60 degrees, with the gate and hopper moving in concert, and the moveable detent 90 bearing up against a locking or back-up rib 92 extending from the locking ring 36. This effectively prevents the moving projection 88 from riding back over the moveable detent 90 and ensures that the hopper and gate rotate in unison in the counter-clockwise direction. The maximum arc of rotation of 210 degrees is possible based on the corresponding arc of the back-up rib 92. It will be understood that different If the hopper is rotated counter-clockwise back beyond the 60 degree mark, this corresponds to the point 92A where the back-up rib 92 terminates resulting in the moving projection 88 being able to ride back over the moveable detent 90 which is now free to move outwards. At the same time, the gate 40 re-engages with the locking ring 36 as the arcuate profile of the retaining projection 84 butts up against the first resilient detent formation 78 and locks into engagement with the corresponding recess 82 within the locking ring. As a result, the counter-clockwise rotation of the hopper causes the gate to close in a manner illustrated in FIGS. 3A and 4A and the simultaneous disengagement of the hopper from the grinder opening.

In the described embodiment, the first and second resilient detent formations 78 and 90 project axially from the gate 40 and are adapted to resiliently deform in the radial direction. It will be understood that, in other embodiments, these resilient detent formations may extend in the radial direction and be adapted to resiliently deform in the axial direction. It will also be understood that, in such alternative embodiments, the corresponding features on the hopper 24, e.g. the retaining projection 84 and moving projection 88, and locking ring 36, e.g. the corresponding recess 82 and back-up rib 92, will be adapted accordingly.

In addition, in the described embodiment, the first resilient detent formation 78 is formed on the gate 40 and the corresponding recess 82 is formed on the locking ring 36. It will be understood that, in other embodiments, the detent formation may be formed on the locking ring 36 and the recess may be formed on the gate 40.

Figure 7A:
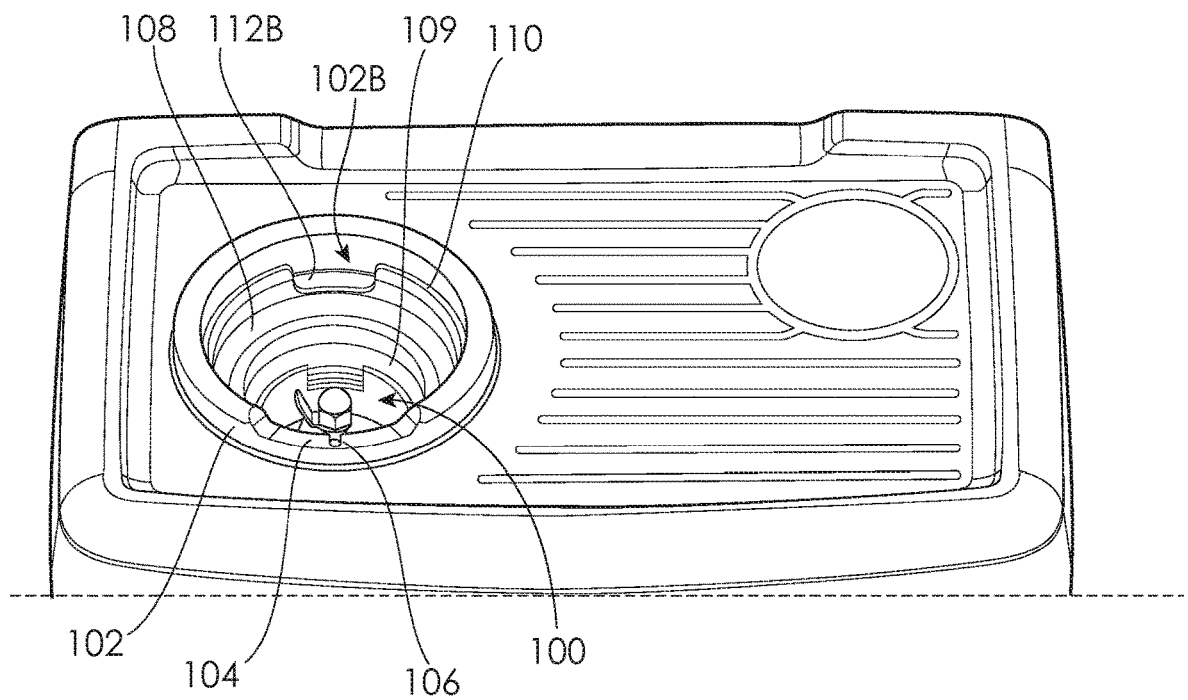
FIG. 7A is a partial top perspective view of part of an espresso machine showing the hopper receiving opening.
Figure 7B:
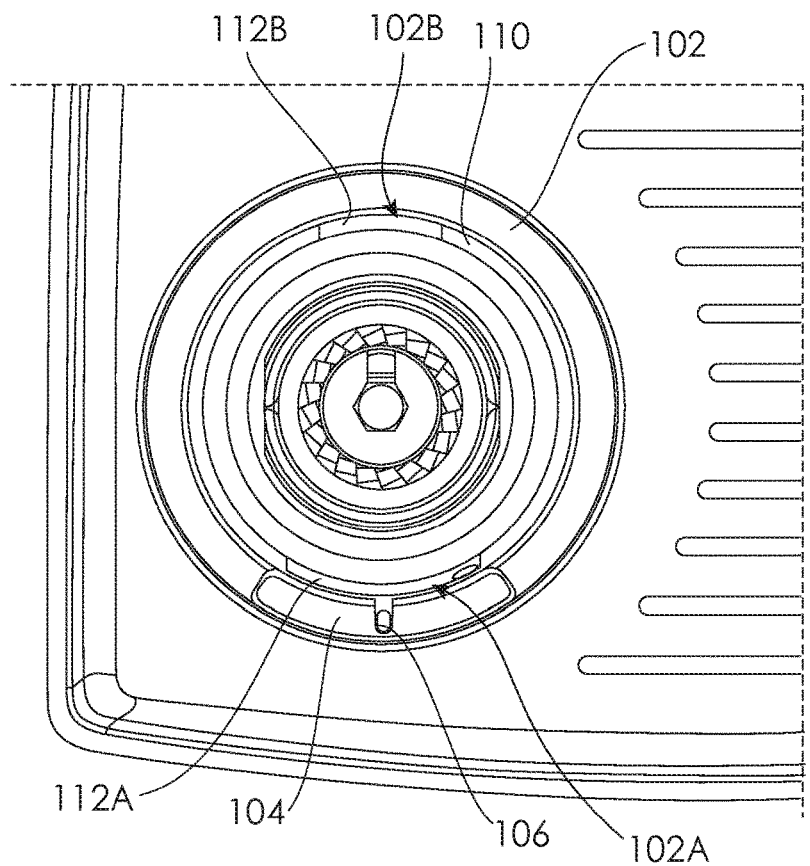
FIG. 7B is a partial plan view of the espresso machine showing the hopper receiving opening.

Referring now to FIGS. 7A and 7B, partial top perspective and plan views, respectively, the espresso machine 10 is shown having an opening 100 for receiving the hopper, the opening being surrounded by a raised lip 102 formed with a front recess 104 which is designed to provide access to view the relevant portion of the adjustment scale 30 on the hopper. In the centre of the recess 104 is a slot 106 for receiving the locking lug 54 so that the locking ring is held in a stationary position when the hopper is engaged with the espresso machine. A complemental rotary coupling arrangement 108 is located within the opening above and in engagement with a grinding adjustment collar 109.

A bayonet rib 110 is formed integrally with the lip 102 just above the rotary coupling arrangement and has first wide and second narrow openings 102a and 102b which provide access to corresponding wide and narrow bayonet recesses 112a and 112b defined in the coupling arrangement for receiving the corresponding bayonet tabs 39A and 39B when in the inserted position shown in FIG. 2A. As a result of the variations in circumferential and radial dimensions of the bayonet tabs and corresponding recesses and openings, it is possible to rotate the hopper through 180 degrees without the bayonet being able to disengage from the housing opening as the radially long tab cannot pass through the radially short opening, and the circumferentially long tab is unable to pass through the circumferentially short opening. Accordingly, it will be understood that in embodiments in which rotation is limited to less than 180 degrees, a standard bayonet fitting may be used, in which the tabs and recesses have the same shape and dimensions.

Figure 7C:
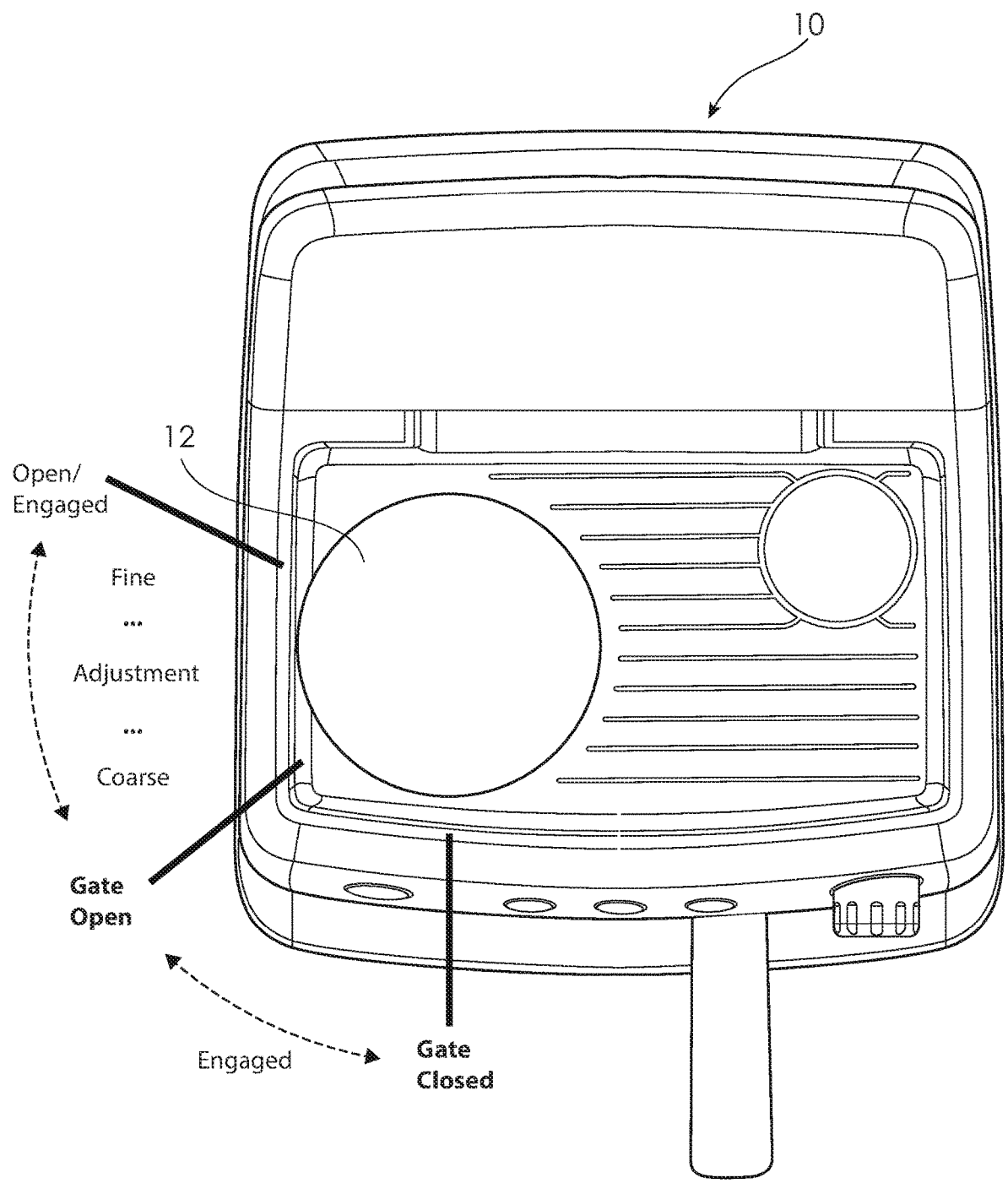
FIG. 7C is a plan view of the espresso machine showing the hopper received in the receiving opening.

FIG. 7C is a plan view illustrating one example of the various angular positions of the hopper 24 when the hopper assembly 12 is received in the opening 100 of the espresso machine 10. The hopper assembly 12 is inserted at the "Gate Closed" position, and then engaged with the espresso machine 10 by rotating the hopper 24 to the "Gate Open" position. At this position, the gate is fully opened and the hopper is fully engaged with the espresso machine 10 in the manner as described above. Over-rotation occurs between the "Gate Open" and "Open/Engaged" positions, in which the gate and hopper rotate in concert in the manner described above, and the angular position of the hopper controls the fineness of the grind, as will now be described in greater detail.

Figure 7D:
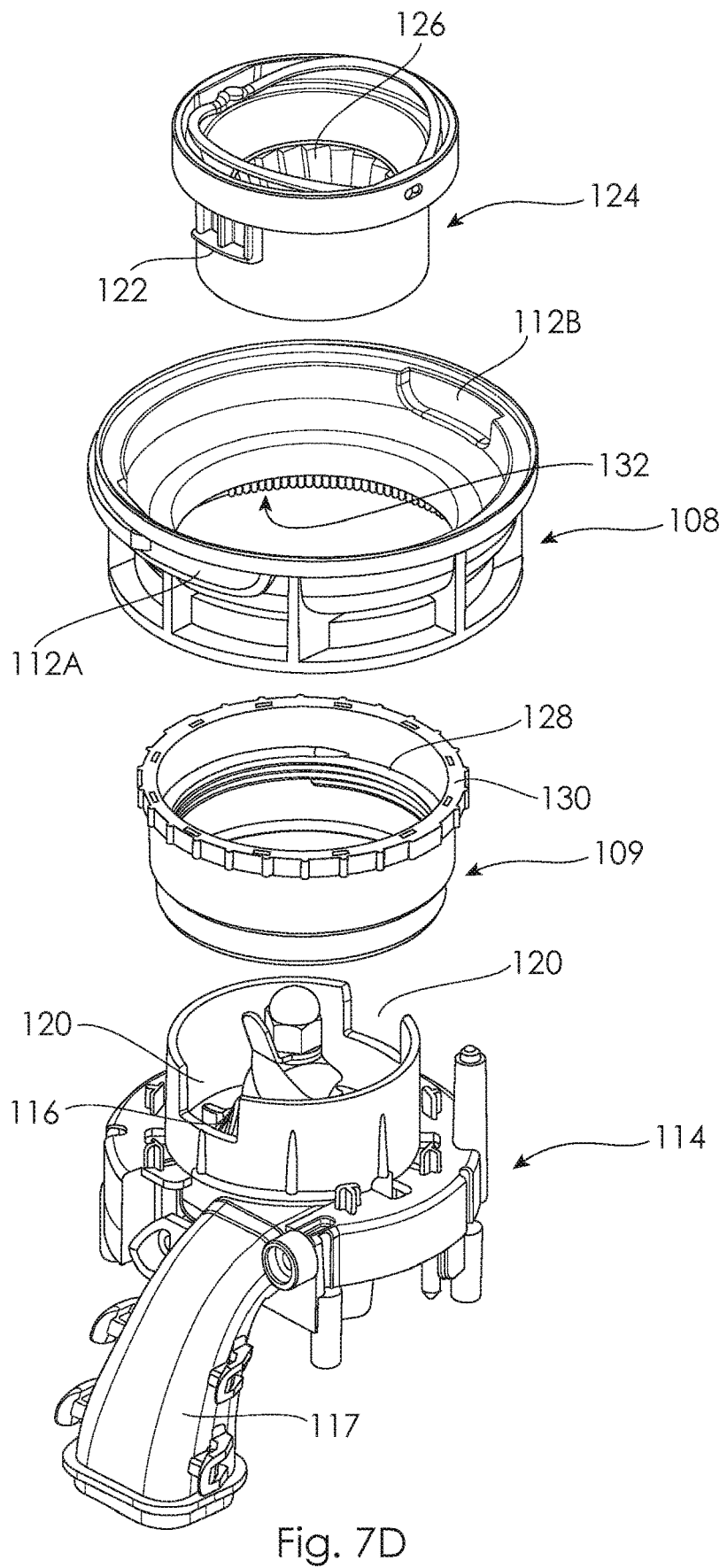
FIG. 7D is an exploded top perspective view of a grinding mechanism and complemental coupling arrangement of a coffee bean grinder in accordance with the FIG. 8 is a partial cross-sectional view of an espresso machine with a coffee bean hopper in accordance with the present disclosure, with the hopper inserted into the espresso machine in the closed position.

FIG. 7D shows the coupling arrangement with additional grinder components, namely grinder assembly 114 having a central lower rotary grinder burr 116 driven by a motor (not shown) and including a feed chute 117 for supplying ground coffee to the filter holder 14 when it activates the cradle 22. A housing 118 extends upwardly from the grinder assembly and is provided with a pair of opposed recesses 120 for receiving opposed engagement wings 122 of a stationary upper burr insert 124 within which an upper burr 126 is located.

The grinder adjustment collar 109 includes an internally two-start threaded portion 128. The upper rim of the collar is formed with castellations 130 which engage with complemental castellations 132 defined in a lower recess of the coupling arrangement 108 to enable these two components to rotate in concert.

Figure 8:
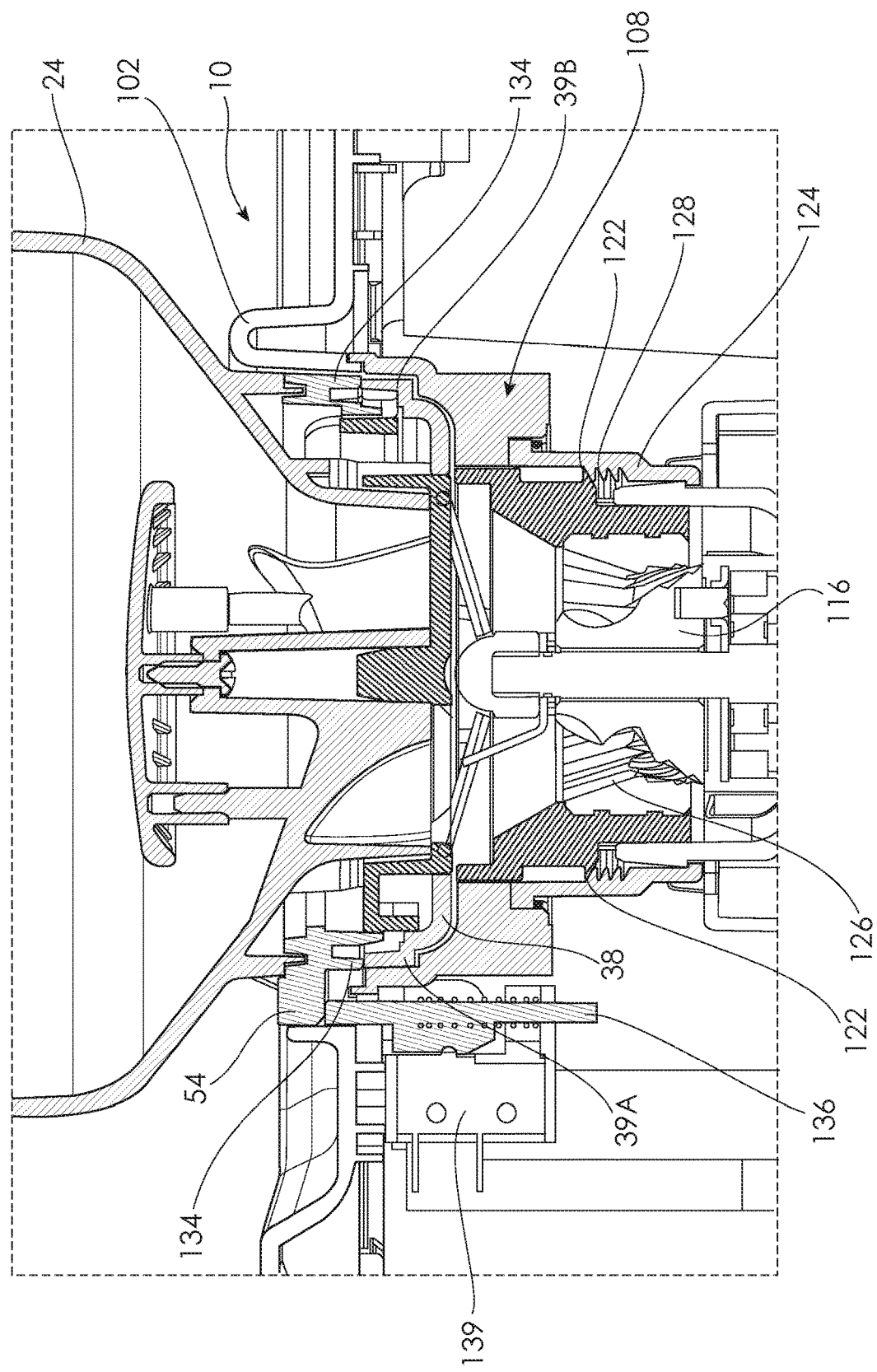

Referring now to FIG. 8, the partial cross-sectional view of the coffee grinder portion of the espresso machine 10 is shown with part of the hopper assembly 24 in an inserted position. In this position, upper bayonet portions 134 of the locking ring 36 are aligned with the bayonet tabs 39A and 39B as is shown in FIG. 2A, and the hopper is closed. The aligned tabs are then inserted through the wide and narrow openings 102a and 102b with the bayonet tabs 39A and 39B nesting in the complemental recesses 112a and 112b. Any rotation of the gate out of the closed position will result in misalignment of the bayonet portions 134, and the bayonet tabs 39A, 39B, thereby preventing insertion of the hopper into the bayonet recesses when the gate is open or partially opened.

Downward movement of the locking lug 54 in the slot 106 causes corresponding downward movement of a sprung actuating pin 136 which in turn activates microswitch 138 to indicate that the hopper is in an engaged or an engaging position. In the inserted position of FIG. 8, the wings 122 of the upper burr insert 124 are shown resting on an uppermost start portion of the internal two-start thread 122 of the rotary coupling arrangement.

Figure 9:
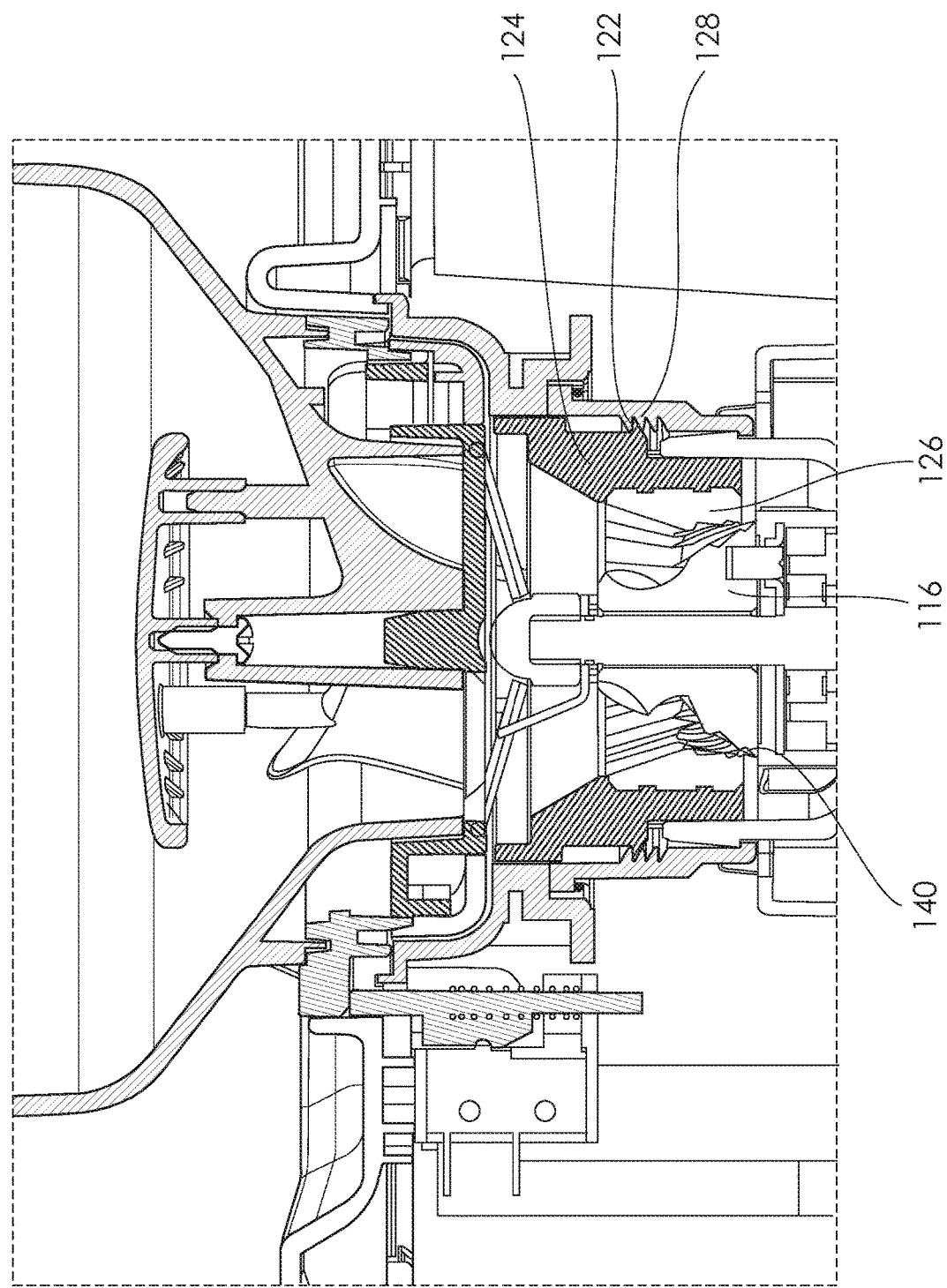
FIG. 9 is a partial cross-sectional view of an espresso machine with a coffee bean hopper, with the hopper engaged with the espresso machine in the open position.

Referring now to FIG. 9, which corresponds to a 60 degree rotation of the hopper 24 and coupling ring 38, the bayonet tabs 39A and 39B of the coupling ring cause corresponding rotation of the rotary coupling arrangement 108 via engagement of the corresponding bayonet recesses 112a and 112b. It can clearly be seen from FIG. 9 how rotation of the hopper, the engaged rotary coupling arrangement 108 and the engaged grinder adjustment collar 109 causes the stationary wings 122 and thus the entire upper burr insert 124 to travel downwards towards the lower grinder burr 116 as the wings 122 are carried downwards on the rotating threads 128. In the 60 degree position, the gate 40 is open and the conical burr grinder is a position corresponding to a coarse grind.

Figure 10:
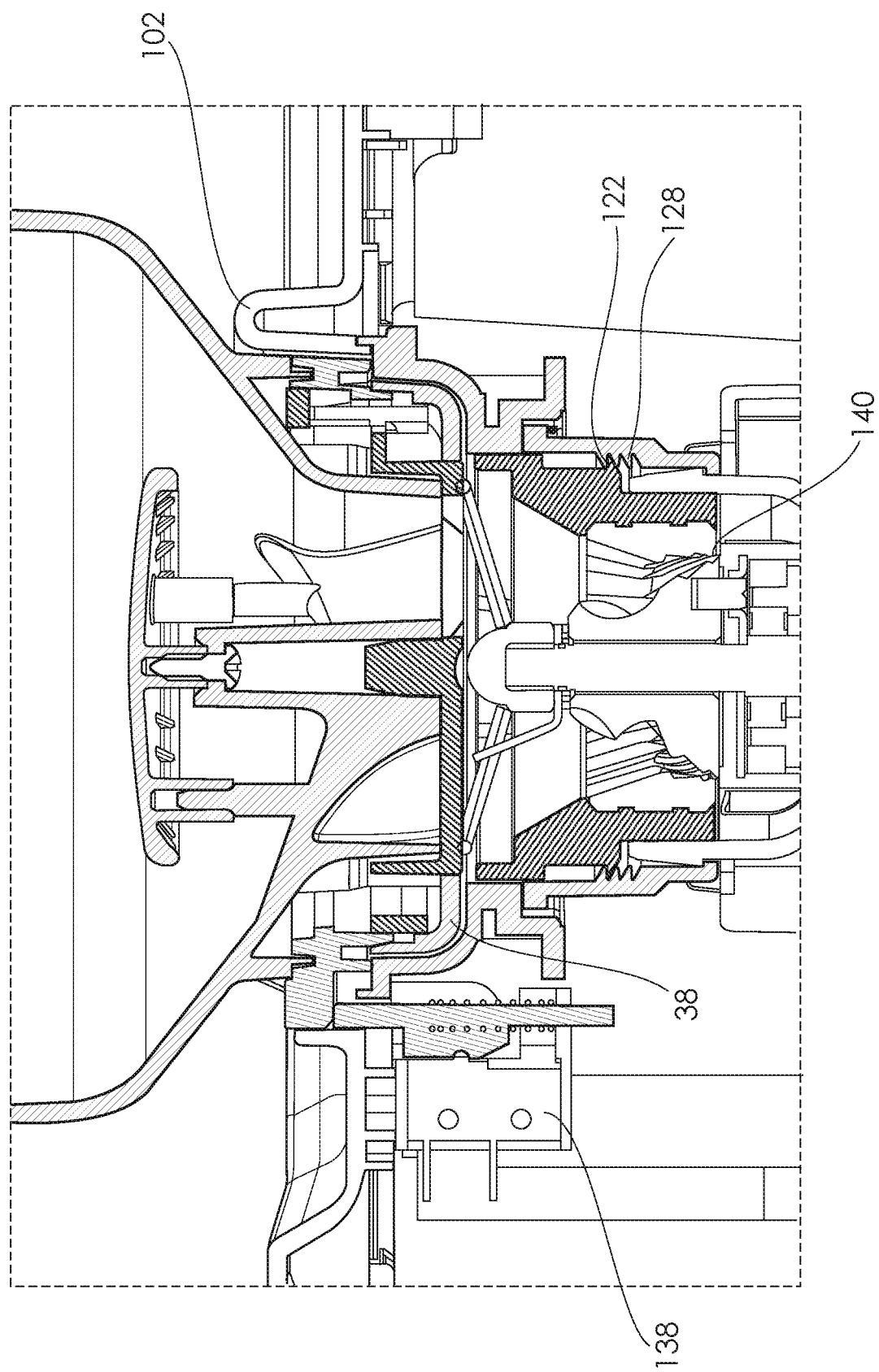
FIG. 10 is a partial cross-sectional view of the espresso machine with a coffee bean hopper, with the hopper engaged with the espresso machine and over-rotated in the open position.

Further over-rotation of the hopper to the 120 degree position of FIG. 10 will result in further downward movement of the upper burr insert 124 as the hopper, coupling arrangement and adjustment collar rotate in concert, with the gap 140 between the upper burr 126 and the lower conical burr 116 decreasing to result in a finer grind. As has previously been described, the rotation of the hopper from the 60 degree position to the 120 degree position and back results in the hopper and the gate rotating in the constantly open position in a grinder adjustment mode. An additional micro switch (not shown) may be activated in response to the hopper travelling beyond 60 degrees, thereby indicating the adjustment mode of operation.

Figure 11:
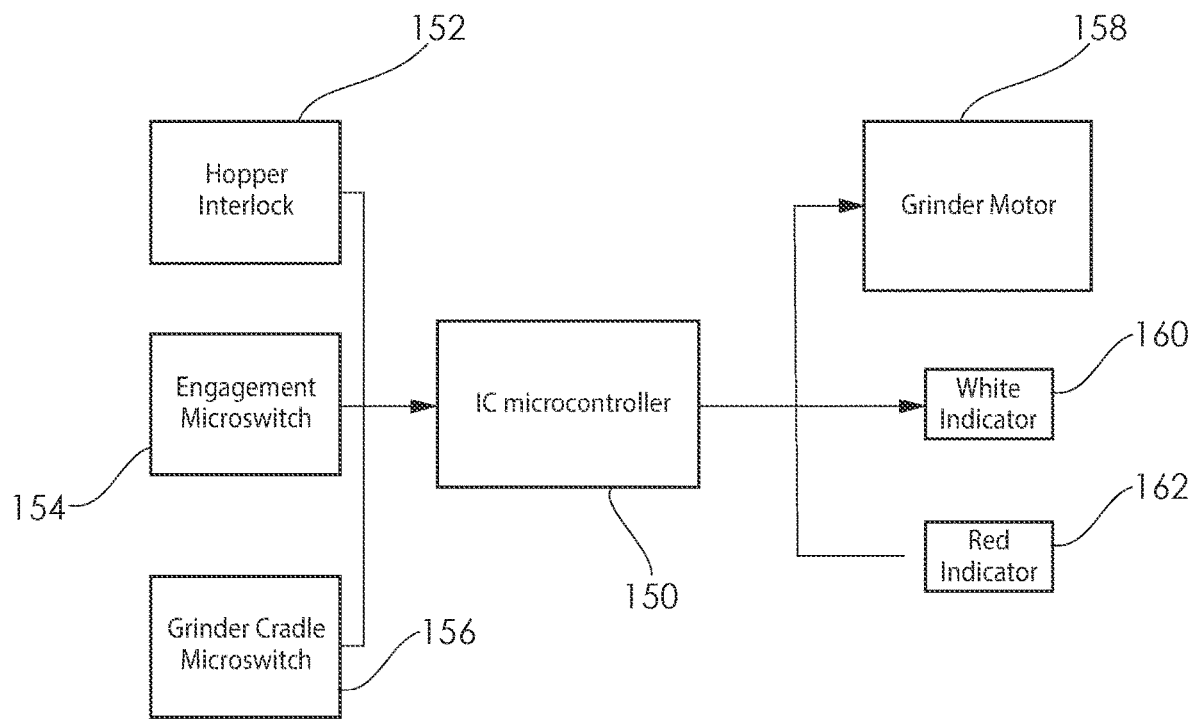
FIG. 11 is a schematic block diagram of the microcontroller inputs and outputs.

Referring now to FIG. 11, a block diagram of a micro controller 150 of the espresso machine is shown with various inputs and outputs, including a hopper interlock microswitch 152, an engagement microswitch 154 and a grinder cradle microswitch 156. Outputs includes a grinder motor output 158, a white indicator 160 and red or warning indicator 162. The hopper interlock can include microswitch 138 which is activated irrespective of whether the bayonet tabs are engaged or not to simply indicate whether the hopper is covering the grinder burrs or not. In the inserted position, this therefore enables the motor to be operated while the gate is closed, so that the coffee beans in the grinder may be ground through prior to servicing the burr area.

The secondary microswitch in the form of the engagement microswitch 154 is used to detect the angle of rotation of the hopper when fully engaged by being activated by the circumferential protruding rib on the upper locking ring 36. Once the gate is opened, which is detected by the engagement microswitch and when both the upper interlock and engagement microswitches are activated, the microcontroller understands that the grinder is ready for normal operation. The various states of the grinder as indicated in the table below, are communicated using an indicate LED having the white and red indicators 160, 162. The grinder is typically operated by actuating the grinder cradle 22. An overheated state of the motor can be determined by measuring a temperature sensor on the motor or can alternatively be inferred by adding cumulative run time within an operating period.

| | Input | | | Output | | |
|---|---|---|---|---|---|---|
| State # | Cradle | Hopper Inserted (primary interlock) | Hopper Engaged + Gate | Motor too hot | Grind indicator (default white) | Motor |
| 1 | 0 | 0 | 0 | 0 | 0 | 0 |
| 2 | 1 | 0 | 0 | 0 | Flash | 0 |
| 3 | 1 | 1 | 0 | 0 | Flash X3 | 1 |
| 4 | 1 | 1 | 1 | 0 | 1 | 1 |
| 5 | 0 | 1 | 1 | 0 | 1 | 0 |
| 6 | 0 | 1 | 0 | 0 | 0 | 0 |
| 7 | 0 | 0 | 1 | 0 | Flash | 0 |
| 8 | 1 | 0 | 1 | 0 | Flash | 0 |
| 9 | X | X | X | 1 | Red | 0 |

Figure 12:
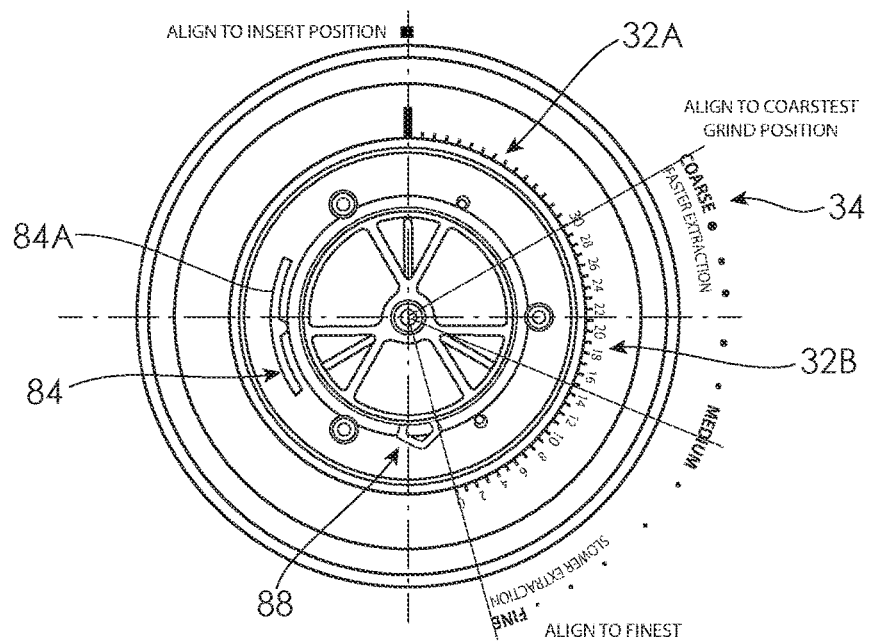
FIG. 12 is a detailed bottom view of a hopper.

FIG. 12 depicts the bottom of the hopper 24, with the graduations 32 and 24, the retaining projection 84 and the moving projection 88 shown in greater detail. The graduations 32 on the reduced diameter portion 30 include dots 32a between the insertion and engaged positions to indicate that the gate is not yet fully open, and numbers 32b in the over-rotation region to indicate the specific fineness level of the grind. As the sidewall 26 extends perpendicular to the page in FIG. 12, The graduations 34 include text to and dots in the over-rotation region to indicate relative grind fineness and the impact it may have on grinding speed, e.g. the former ranging from "Coarse" to ""Fine" and the latter corresponding with "Faster Extraction" to "Slower Extraction", and are depicted as if they have been peeled off the sidewall 26.

The espresso machine and hopper assembly described above are embodiments of a foodstuff processing apparatus and a foodstuff dispensing hopper assembly, respectively. It will be appreciated that other embodiments of such a foodstuff processing apparatus and foodstuff dispensing hopper assembly include appliances such as spice grinders, herb shears, vegetable graters and slicers, and their corresponding hopper assemblies.

In the described embodiments, the over-rotation of the hopper assembly with respect to the espresso machine controlled the level of fineness of the coffee bean grinder built into the espresso machine. It will be appreciated that over-rotation of the hopper assembly may be used to control any function of a food processing apparatus that varies continuously or discretely over a range, including temperature, fineness of comminution or slicing and motor speed.

In the described embodiments, rotation between the gate open and closed positions, and the corresponding hopper assembly insertion and engagement positions, described an angle of 60 degrees. It will be appreciated that other angles are possible depending on the configuration of the gate, e.g. dividing the bottom opening into two sectored window portions alternating with two closed portions would correspond to rotation between the gate open and closed positions describing an angle of 90 degree.

In the described embodiments, the locking ring is used to ensure movement of the gate is prevented relative to the food processing apparatus and allowed relative to the hopper, until the gate is open and then handed over to the hopper such that movement of the gate is prevented relative to the hopper and allowed relative to the food processing apparatus. It will be appreciated that, in alternative embodiments, this hand over function may be achieved without the locking ring, by providing the relevant features, e.g. the corresponding recess and retaining rib, within the receiver opening of the food processing apparatus.

It will be understood that the invention disclosed and defined in this specification extends to all alternative combinations of two or more of the individual features men-

The invention claimed is:

1. A foodstuff dispensing hopper assembly comprising:
a sidewall;
a bottom opening;
a gate rotatably mounted adjacent the bottom opening for selectively opening and closing the bottom opening;
coupling means for detachably and rotationally coupling the hopper assembly to a foodstuff processing apparatus, with the bottom opening in communication with a foodstuff receiving opening of the foodstuff processing apparatus; and
an interlock mechanism for interoperating with the gate to enable rotation of the bottom opening relative to the gate into an open position when the coupling means is being rotationally coupled to the foodstuff processing apparatus and to enable rotation of the bottom opening relative to the gate into a closed position when the coupling means is being counter-rotationally decoupled from the food processing apparatus; and
wherein the interlock mechanism comprises:
a locking ring rotatably mounted to the hopper assembly and adapted to enable rotation of the hopper assembly between a first angular position and a second angular position; and
locking ring engagement means adapted to lock the gate to the locking ring when the hopper assembly is rotated between the first angular position and the second angular position.

2. The foodstuff dispensing hopper assembly according to claim 1, wherein the locking ring engagement means is adapted to unlock the gate from the locking ring when the hopper assembly is over-rotated past the second angular position, and the interlock mechanism further comprises hopper engagement means adapted to lock the gate to the hopper assembly when the hopper assembly is over-rotated between the second angular position and the third angular position such that the gate rotates in concert with the bottom opening and the bottom opening remains in the open position.

3. The foodstuff dispensing hopper assembly according to claim 2, wherein the hopper engagement means comprises:
first abutting means for maintaining the gate in concert with the bottom opening during over-rotation from the second angular position to the third angular position; and
second abutting means for maintaining the gate in concert with the bottom opening during counter-rotation from the third angular position to the second angular position.

4. The foodstuff dispensing hopper assembly according to claim 3 wherein the second abutting means includes a movable detent extending from the gate, a projection defined on the hopper assembly which is configured to ride over the detent during initial over-rotation of the gate and bottom opening, and a locking rib defined on the locking ring for locking the detent in abutting relationship with the projection to prevent the projection from riding back over the detent.

5. The foodstuff dispensing hopper assembly according to claim 1, wherein the locking ring engagement means comprises:
a recess formed on one of the locking ring and the gate; and
a complementary detent formation provided on the other of the locking ring and the gate,
wherein the locking ring engagement means is adapted such that relative rotation between the locking ring and the gate causes the recess and complementary detent formation to lock into and out of engagement with each other.

6. The foodstuff dispensing hopper assembly according to claim 5, wherein the locking ring engagement means further comprises a retaining formation extending from the hopper assembly, the retaining formation positioned and dimensioned such that it retains the detent formation and the recess in locking engagement with each other between the first and second angular positions.

7. The foodstuff dispensing hopper assembly according to claim 1, wherein the bottom opening comprises a plurality of radially spaced, sectored window alternating with closed portions, and the gate comprises a plurality of corresponding radially spaced, sectored windows and shutters.

8. The foodstuff dispensing hopper assembly according to claim 1, wherein the coupling means comprises a circumferentialily long bayonet tab and an opposed circumferentially short bayonet tab which, although shorter in a circumferential direction projects further outwards in a radial direction than the circumferentialily long bayonet tab.

9. A foodstuff processing system comprising:
the foodstuff dispensing hopper assembly according to claim 1; and
the foodstuff processing apparatus comprising:
complemental coupling means for receiving the coupling means of the hopper assembly such that the bottom opening of the hopper assembly is in communication with the foodstuff receiving opening; and
a food processing mechanism for processing the foodstuff.

10. A foodstuff processing system comprising:
a foodstuff processing apparatus for processing foodstuff; and
a foodstuff dispensing hopper assembly for storing and dispensing the foodstuff to be processed,
wherein the hopper assembly comprises a side wall, a bottom opening, a gate rotatably mounted adjacent the bottom opening for selectively opening and closing the bottom opening, and coupling means for detachably and rotationally coupling the hopper assembly to the processing apparatus,
wherein the processing apparatus comprises a foodstuff receiving opening, complemental coupling means for receiving the coupling means of the hopper assembly such that the bottom opening of the hopper assembly is in communication with the foodstuff receiving opening, and a food processing mechanism for processing the foodstuff dispensed from the hopper assembly through the foodstuff receiving opening, and
wherein the processing system further comprises an interlock mechanism adapted to lock the gate of the hopper assembly with the processing apparatus as the hopper assembly is rotated between an inserted position and a coupled position such that the gate is fixed relative to the processing apparatus and the hopper assembly rotates relative to the gate, wherein the bottom opening is closed by the gate in the inserted positon and rotation of the hopper assembly to the coupled position thereby selectively opens the bottom opening.

11. The foodstuff processing system according to claim 10, wherein the interlock mechanism is configured to unlock the gate from the processing apparatus and engage the gate with the hopper assembly when the hopper assembly over-rotates past the coupled position such that the gate and hopper assembly over-rotate in concert and the bottom opening remains open during over-rotation.

12. The foodstuff processing system according to claim 11, wherein the system is configured such that over-rotation controls a function of the foodstuff processing apparatus.

13. The foodstuff processing system according to claim 12, wherein the foodstuff processing system includes a grinder and over-rotation controls the fineness of the grind via a grind adjustment mechanism.

14. The foodstuff processing system according to claim 13, wherein the grinder includes a burr grinder having upper and lower burrs; and wherein the grind adjustment mechanism includes a rotatable grinder adjustment collar and is configured such that, during over-rotation of the hopper assembly, the grinder adjustment collar rotates in concert with the hopper assembly to vary the axial distance between the upper and lower burrs and thereby control the fineness of the grind.

15. The foodstuff processing system according to claim 14, wherein the lower burr is provided in a lower burr housing fixed to the processing apparatus; the upper burr is provided in an upper burr insert; and the grind adjustment mechanism further includes engagement wings extending radially from the upper burr insert and complemental axial guide slots formed in the lower burr housing for receiving the engagement wings such that the upper burr insert is allowed to translate in the axial direction but rotate relative to the lower burr housing; and the grinder adjustment collar is provided with an internal thread adapted to be engaged with the engagement wings of the upper burr insert during over-rotation of the hopper assembly.

16. The foodstuff processing system according to claim 14, wherein the complemental coupling means comprises a rotary hopper engagement ring adapted to engage the grinder adjustment collar to the hopper assembly such that the hopper assembly, hopper engagement ring and grinder adjustment collar rotate in concert.

17. The foodstuff processing system according to claim 16, wherein the coupling means comprises first and second bayonet tabs; and the complemental coupling means comprises first and second bayonet receiving recesses and a retaining rib for respectively receiving and retaining the first and second bayonet tabs.

18. The foodstuff processing system according to claim 17, wherein the retaining rib is formed in a top cover of the housing and defines complemental first and second bayonet insertion openings, and the first and second bayonet receiving recesses are formed in the hopper engagement ring such that the first and second bayonet tabs can be inserted through the first and second bayonet insertion openings into the first and second bayonet insertion recesses, respectively, and then rotated with the hopper engagement ring.

19. The foodstuff processing system according to claim 17, wherein:
the first bayonet tab has a circumferential length that is greater than a circumferential length of the second bayonet tab, and the first bayonet tab has a radial depth that is less than a radial depth of the second bayonet tab; and
the retaining lip and first and second bayonet insertion recesses are dimensioned such that, when the hopper assembly is inserted into the foodstuff processing apparatus and rotated 180°, the first bayonet tab is retained by the retaining lip due to its circumferential length being greater than the circumferential length of the second bayonet insertion recess, and the second bayonet tab is retained by the retaining lip due to its radial depth being greater than the radial depth of the first bayonet insertion recess.

20. The foodstuff processing system according to claim 10, wherein the food processing apparatus comprises an insertion interlock switch for detecting the insertion of the hopper assembly into the food processing apparatus, the insertion interlock switch enabling the food processing mechanism to be operated with the hopper assembly in an inserted but not fully engaged position.

21. The foodstuff processing system according to claim 10, wherein the food processing apparatus comprises an engagement interlock switch for detecting the rotational coupling of the hopper assembly to the food processing apparatus.

* * * * *